Figure 1:
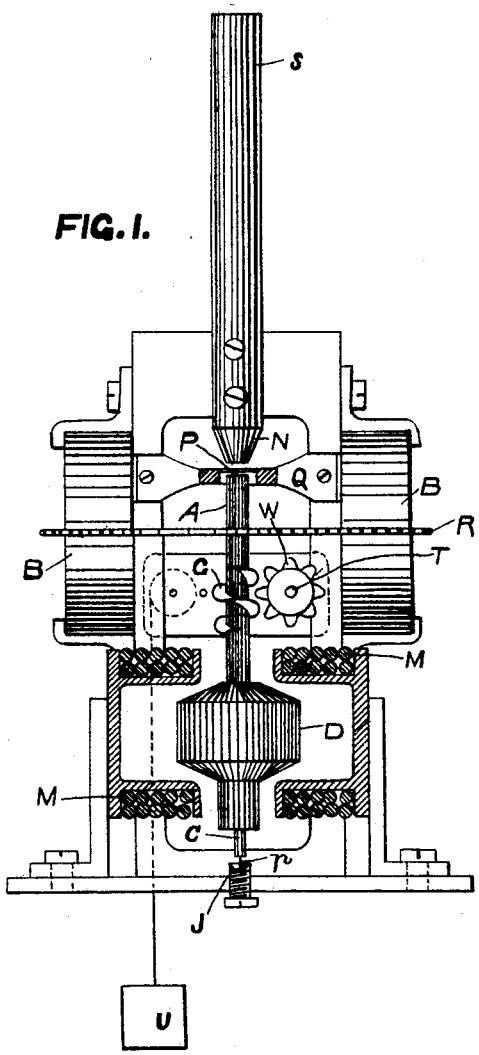

No. 611,809. Patented Oct. 4, 1898.
S. EVERSHED.
ELECTRIC METER.
(Application filed Dec. 21, 1897.)
(No Model.) 3 Sheets—Sheet 1.

No. 611,809. Patented Oct. 4, 1898.
S. EVERSHED.
ELECTRIC METER.
(Application filed Dec. 21, 1897.)
(No Model.) 3 Sheets—Sheet 2.
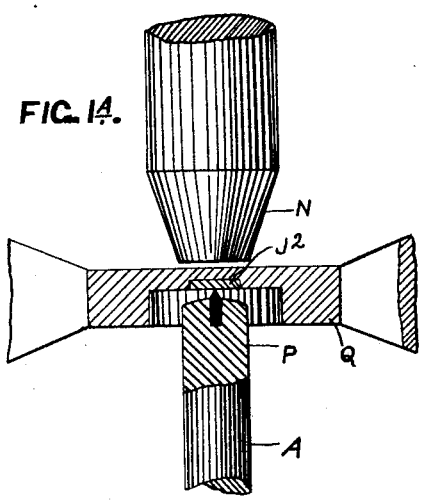
FIG. 1ᴬ.
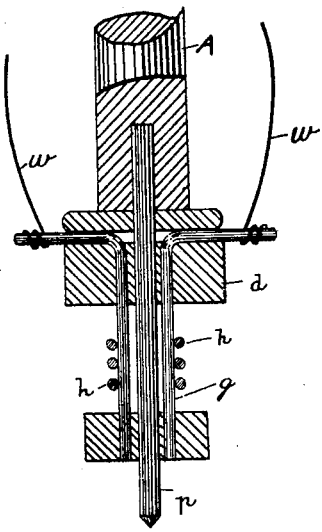
FIG. 3.
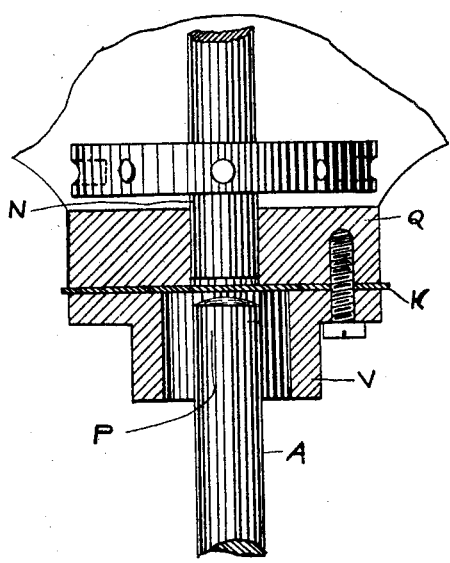
FIG. 2ᴬ.
FIG. 5.
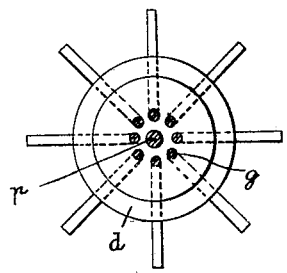
FIG. 4.
Witnesses:
E. P. Bolton
O. D. Munk
Inventor:
Sydney Evershed
By Richards
his Attorneys.

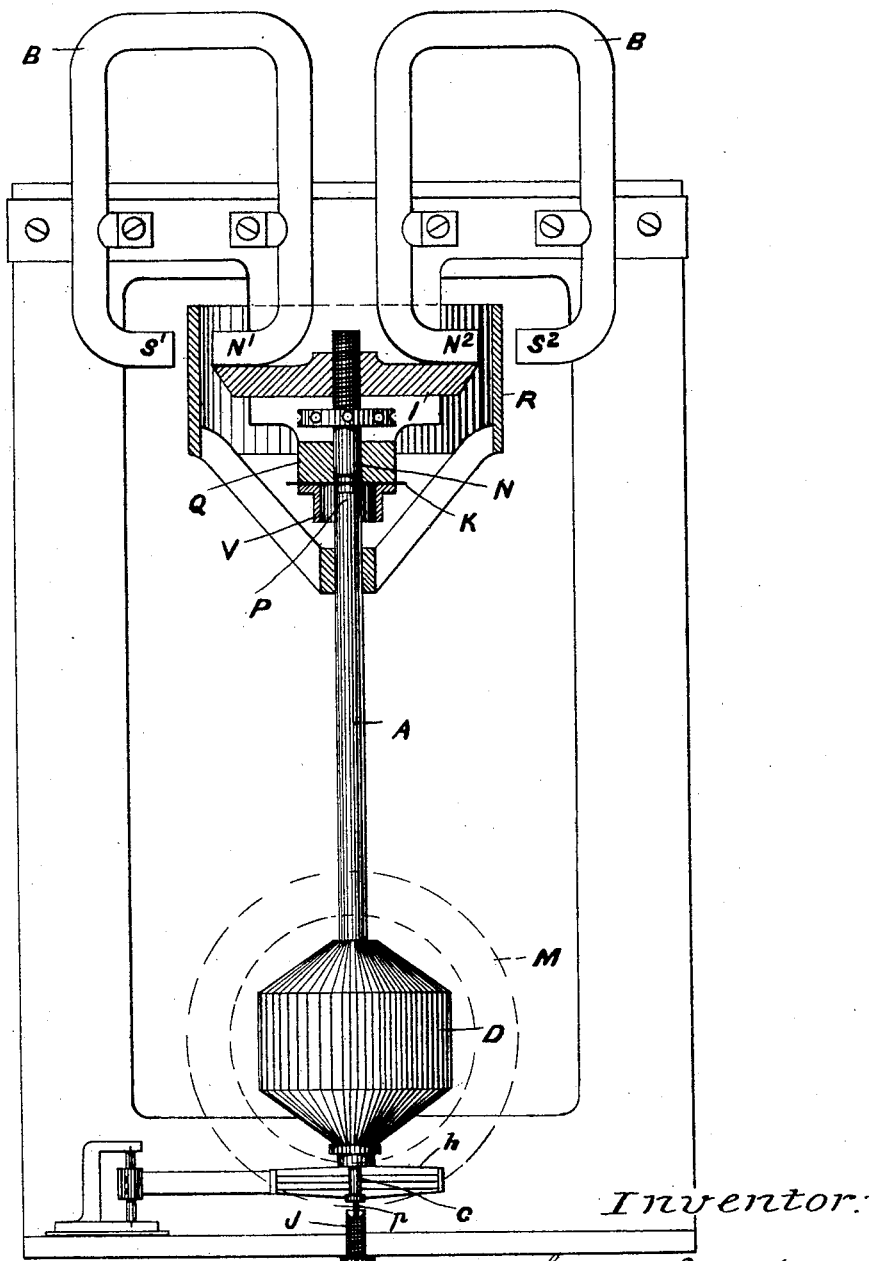

UNITED STATES PATENT OFFICE.

SYDNEY EVERSHED, OF LONDON, ENGLAND.

ELECTRIC METER.

SPECIFICATION forming part of Letters Patent No. 611,809, dated October 4, 1898.

Application filed December 21, 1897. Serial No. 662,927. (No model.)

*To all whom it may concern:*

Be it known that I, SYDNEY EVERSHED, a subject of the Queen of Great Britain and Ireland, residing at London, England, have invented an Improvement in Electric Meters, of which the following is a specification.

This invention relates to electric-supply meters of the motor type, and particularly to a type described in the specification of English patent granted to W. E. Ayrton and J. Perry, numbered 2,642 and dated 1882; and its objects are to increase the working range and reduce the power wasted in the said meters by the reduction to an infinitesimal amount of the frictional resistance of the rotating axle and to drive the counting-train independently of the motor.

In this specification and in the following claims the phrase "motor-meter" is used to signify any electric-supply meter in which an electric motor is employed to measure directly or indirectly the quantity of electric energy or quantity of electricity supplied, and the phrase "motor-meter of the Ayrton-Perry type" is used to signify an electric-supply meter of the motor type having a rotary armature in shunt to the work and field-coils in series with the work and a brake whose resistance is proportional to the speed. The word "train" is used to signify any counting mechanism, such as is commonly used to indicate the quantities measured by a meter.

A meter made in accordance with my invention consists, substantially, of an electric motor whose armature and field-magnet coils carry, respectively, a current proportional to the pressure and a current proportional to the whole current supplied, so that the torque is proportional to the power supplied. The driving-torque being resisted by a device known as a "Foucault current-brake," the speed of the motor is proportional to the power supplied. The armature is wound with fine wire and connected through its commutator as a shunt on the main supply-circuit, a sufficiently large resistance being connected in series with the armature to reduce the electric pressure on the armature and commutator to a safe amount. This resistance when wound non-inductively also adapts the meter to alternate-current work. Fixed coils surrounding the armature as closely as possible and carrying the total current being supplied serve as the field-magnet coils. The armature is attached to and rotates with a vertical axle, to which a cylinder or disk, of aluminium, copper, or other good conductor of electricity, is also attached to provide the required opposing torque by means of stationary magnets whose induction traverses the cylinder or disk and sets up eddy-currents therein. The axle is pivoted in centers at the top and bottom, and in order to reduce the pivot-friction as much as possible the axle is, according to my invention, made of iron or steel, and immediately above the upper pivot a permanent or electromagnet is fixed with its magnetic axis vertical and in line with the rotational axis of the spindle. By observing suitable proportions of the various parts the upward vertical attraction due to the magnetic induction passing from the magnet into the axle may be made not only to support the weight of the armature-axle and other parts attached thereto, so that the bottom pivot is wholly or partially relieved of the pressure due to their weight, but the axle is also retained by the magnetic forces in the axis of the magnetic induction and is therefore retained in a vertical position without lateral or rubbing bearings. The pivot-friction is thus almost entirely eliminated. An axle supported in this way may be and is herein called a "magnetically-pivoted" axle and the end of the axle at which the magnetic attraction is exerted may be and is herein called a "magnetic pivot." That pole of the fixed magnet which produces the said magnetic attraction may be and is herein called the "supporting-pole," and the arrangement of supporting-pole and magnetic pivot constitutes my unipolar means of support. It is obvious that any want of symmetry in a magnetic pivot will tend to produce a turning moment on the axle, and in order that a magnetically-pivoted axle may work freely it is therefore essential that it should be a true figure of revolution symmetrical about the axis of rotation. The pole of the fixed magnet should be a similar figure, if possible, although this is not absolutely essential. A turning moment may also be produced by want of uniformity of induction density in the magnetic pivot and fixed pole, and since this effect is due to differences in the permeability of the iron or steel, which cannot be altogether eliminated, a magnetic pivot and its supporting-pole should be small in diameter, so that any unbalanced magnetic attractive force may have as small a turning moment as possible. For similar reasons it is desirable to so proportion a magnetic pivot and its pole that the greater part of the induction between them shall be vertical and not radial in direction. The radial induction, if not absolutely symmetrically disposed around the pivot, will force the pivot toward that side on which the induction is greatest and may cause the axle to foul adjacent fixed parts of the meter. Even the utmost precision of mechanical workmanship is insufficient to entirely eliminate the effects I have described. Hence the importance of observing the essential conditions as to the symmetry and dimensions of the magnetic pivot and its supporting-pole and as to the vertical direction of the magnetic induction. It is obvious that this magnetically-pivoted axle, though described by me in connection with other parts of a specific type of motor-meter, is applicable to any type or form of motor-meter in which a rotating axle is employed, of which it is important to reduce to an infinitesimal point the frictional resistance of rotation.

In order to obtain the full advantage of the reduction in pivot-friction due to my magnetic pivot in my specific type of motor-meter having an armature, the armature-commutator requires to be designed so as to avoid sensible friction due to brush contact. According to my invention the commutator may consist of a number of parallel bare wires arranged symmetrically around the axle and parallel therewith. The wires are insulated from each other and from the axle by means of two insulating collets or collars, to which their ends are attached, the whole arrangement being analogous to a lantern-wheel, such as is used in a clockwork. The diameter of a commutator made in this manner is only limited by the size to which the axle which forms its center can be reduced. I provide a long and fine pivot at the lower end of the axle and build up my commutator upon the upper part of this pivot, leaving a sufficient length of pivot projecting below to work in a jewel or other center. A modified form of my commutator may be made by laying a number of insulated wires around and upon the axle or pivot and fixing them thereto by a suitable clamping-ring at each end of the commutator. When the wires have been thus fixed, the insulating material with which they are covered is scraped off from the peripheral surface of the commutator.

The commutator-brushes may each consist of two or three fine elastic wires, and in order to insure good contact between the commutator and the brushes both the commutator-wires and the brush-wires should be made of some durable and non-oxidizable metal, such as platinum or gold or an alloy in which either of those metals is an ingredient.

The counting mechanism or train may be controlled by means of a worm on the armature-spindle engaging in a worm-wheel fixed to the first axle of the train. In order to relieve the motor from the work required to drive the train, I attach a drum to one of the axles of the train and hang a weight therefrom by means of a flexible cord coiled upon the drum. The weight is sufficiently heavy to just overcome the friction of the train; but the worm-gearing does not permit the weight to drive the armature-spindle. With this arrangement the motor merely regulates the speed of the train, acting in an analogous manner to the escapement of a clock. The weight may be made of iron or steel and be acted upon by a fixed coil, as described in the specification to English Patent No. 7,484 of 1896.

In order that my invention may be better understood, I will now describe it with reference to the accompanying drawings and to the letters marked thereon.

Figure 1 shows a meter with its axle magnetically pivoted and the train driven by a weight and its speed controlled by worm-gearing. Fig. 2 shows a modified form of my meter in which the induction for magnetically pivoting the axle is drawn from the magnets used for the Foucault brake and the train driven by means of an electromagnet which imparts a reciprocating motion to a magnetized lever. Figs. 1$^a$ and 2$^a$ show two forms of my magnetic pivot. Figs. 3 and 4 are longitudinal and transverse sections of my commutator. Fig. 5 shows the arrangement of the commutator-brushes.

In Fig. 1, which represents a motor-meter of the Ayrton-Perry type, A is the axle, which may be made of soft iron or steel, pivoted at the bottom in a jeweled center or cup J and magnetically pivoted at the top. When the attractive force of the pole N is too small to support the whole weight of the axle and parts attached thereto, the bottom pivot of the axle rests in the center or cup jewel J and the magnetic pivot P is held centrally immediately beneath, but not touching, the upper jewel J$^2$. This jewel has a flat under surface, as shown in Fig. 1$^a$, and a hardened-steel point is let into the pivot P in order that it may rest against J$^2$ in the event of the attractive force being greater than the weight to be supported. This jewel J$^2$ merely serves to prevent the axle from rising and in no way guides the steel point, so that the pivot P is always free to take up its position in the axis of the magnetic system. With this form of my magnetically-pivoted axle it is immaterial whether the axle runs on the top or bottom jewel, and in practice I adjust the pole N until the axle will run on whichever jewel it is brought into contact with. D is the armature, preferably having a drum-winding and connected in the ordinary manner to the commutator C. The armature is connected by means of brushes (not shown) in shunt to the work being measured, a non-inductive resistance being connected in series with the armature. The armature is closely surrounded by coils M M, carrying the main current. The brake is a conducting-disk R, attached to the axle and adapted to rotate between the poles of the magnetic brake B B. The counting mechanism or train is driven or its speed controlled by means of a worm G, engaging in a worm-wheel W, attached to an axle T, which may conveniently be the first axle of the train. One of the axles of the train, preferably the last, may have a drum attached to it, on which is wound a cord supporting a weight U, the function of the weight being to overcome the friction of the train, so that the armature-axle merely controls the speed and does not have to do any work in driving the train. The weight of the axle and parts attached thereto is supported by means of a fixed magnet N S, having its lower pole N turned down to the same diameter as the axle, the upper end of which, P, forms the magnetic pivot. The magnet N S may be made adjustable in a vertical direction, so as to provide means for adjusting the magnetic attraction between N and P until it exactly suffices to support the weight of the axle.

Fig. 2 shows a modified form of my meter in which the brake takes the form of a cylinder R. With this modified arrangement of parts the magnetic induction required for magnetically pivoting the axle is conveniently drawn from the poles $N'$ $N^2$ of the brake-magnets. For this purpose an iron yoke I, joining the poles $N'$ $N^2$, has an adjustable supporting-pole N screwed into it. The supporting-pole fits within a fixed bracket Q, to the lower surface of which a thin metal plate K is clamped by means of a ring V. The upper jewel is dispensed with in this modification. The axle has no guide or support at the upper end, the magnetic attraction between N and P sufficing to keep the axle accurately in the center of rotation. The ring V merely serves to prevent the axle from being accidentally displaced sidewise beyond the range of the magnetic forces. With this form of magnetic pivot and supporting-pole (shown more clearly in Fig. $2^a$) it is necessary to adjust the pole N so that the axle will always run on the bottom jewel, so that should it by chance touch the plate K it will fall again until it rests at the bottom jewel. In Fig. 2 the main coils M are indicated only by dotted lines. One commutator-brush $h$ is shown, the other being removed in order to show the commutator.

In carrying out my invention the axle itself may be made of hardened steel permanently magnetized; but I prefer to make it of mild steel or soft iron of the best and most uniform quality obtainable in order to secure perfect uniformity of permeability (and consequently induction) and therefore absence of turning movement due to irregular distribution of induction.

The diameter of the magnetic pivot and the supporting-pole is determined by the weight to be supported and the distance or air-gap between the pivot and pole. This distance cannot be reduced indefinitely, since with a very small air-gap it is difficult to adjust the attractive force accurately, and it is, moreover, desirable to provide some such means for preventing the magnetic pivot from coming into contact with the supporting-pole as are shown in Figs. $1^a$ and $2^a$—namely, a jewel J or a plate K or other like device. I find about one one-hundredth of an inch to be a convenient distance between the magnetic pivot and its supporting-pole, and with a soft-iron or mild-steel axle about one-fifth inch in diameter a total weight of about half a pound can be supported. If the weight to be supported is less than this, it is preferable to diminish the diameter of the pivot and pole rather than increase the length of air-gap between them. In short, the magnetic pivot should always be made as small as is consistent with a fairly-long air-gap. The induction density in the supporting-pole should be of course as high as possible, and for this purpose I sometimes make the pole conical, as shown in Figs. 1 and $1^a$.

It is to be clearly understood that my magnetic pivoting dispenses with the necessity for any guide to keep the top pivot central, thus entirely eliminating that source of friction. The only friction experienced by my magnetically-pivoted axle is that due to the very slight unbalanced pressure in a vertical direction against either the top or the bottom jewel, and by careful initial adjustment this may also be practically eliminated.

One form of my commutator is shown in Figs. 3 and 4. The lower end of the axle is drilled to receive a fine steel pivot $p$. Insulating-collets $d$ $d$, drilled with one central hole and a concentric ring of holes corresponding in number to the number of sections in the commutator, are driven tightly on the pivot. The wires $g$ $g$ are fitted tightly in the concentric holes and bent at a right angle at the upper end of the commutator in order to receive the connecting-wires $w$ $w$ from this armature. The holes in the collets are conveniently drilled by means of a pantograph drilling-machine similar to the pantograph engraving-machines in common use. After building up the commutator the peripheral surface may be ground down until about half the thickness of the commutator-sections has been removed. In this way the commutator-surface is left cylindrical and accurately concentric with the pivot $p$. It is, however, not essential to grind the commutator-sections in this way, since the commutator is easily made less than one-sixteenth of an inch in diameter, and the absence of a truly-cylindrical surface does not add appreciably to the friction of the brushes.

Fig. 5 shows the commutator and brushes in plan. The brushes consist of a light rod or bow $r$, strung with a number of fine wires $h$ and pivoted on a fixed block at $i$ $i$. The brushes are maintained in contact with the commutator by means of a spring $v$, passed through insulating-brushes in the bows $r$ $r$. This arrangement provides for a readily-adjustable and elastic pressure of the brushes on the commutator and also insures exact equality of pressure on the two sides of the commutator.

I have described my magnetic pivot in connection with a motor-meter of the Ayrton-Perry type, in which I have applied it; but it is equally applicable to any motor-meter. For example, in the various forms of alternate-current meters in which an induction-motor is employed my magnetic pivot may be usefully employed to support the weight of the rotating parts. Again, my magnetic pivot is particularly applicable to the various types of motor-meters in which a Foucault brake is employed, the necessary magnetic induction for the supporting-pole being conveniently obtained from the brake-magnets in a similar manner to that shown in Fig. 2.

I have shown permanent magnets as the means for producing the induction for the supporting-pole of my magnetic pivot; but although I consider permanent magnets to be preferable I do not confine myself to their use, and in cases where permanent magnets are not suitable for any reason I substitute electromagnets for them. For example, in some types of motor-meter the brake-magnets are electromagnets, and in such meters the magnet for the supporting-pole may conveniently be an electromagnet also, or the supporting-pole may derive its induction from the brake-magnets in a similar manner to that described in connection with permanent brake-magnets.

Having now described my invention, what I claim, and desire to secure by Letters Patent, is—

1. In a motor-meter of the Ayrton-Perry type having a Foucault brake, a vertical axle an armature and a wire or lantern commutator on the said axle unipolar means for magnetically supporting and pivoting the said axle a counting-train adapted to be driven by a motive force other than that of the said axle and means for controlling the speed of the train by the rotation of the said axle substantially as described.

2. In a motor-meter a vertical axle of magnetic material, adapted to rotate with limited vertical play between upper and lower jewels or other stops, in combination with a magnet having one pole situated above the said axle and adapted to provide a magnetic support and pivotal guidance to the said axle substantially as described.

3. In a motor-meter with a Foucault brake the combination with the brake-magnets of a vertical axle, magnetically supported and pivoted by unipolar means adapted to be magnetized by or in conjunction with the brake-magnets, substantially as described.

4. In a motor-meter, a vertical rotative axle, a self-actuated counting-train, and means upon the said axle to control the speed or escapement of said train, substantially as described.

5. In a motor-meter a commutator formed by a number of parallel insulated wires closely surrounding a part of the motor-axle having the smallest practicable diameter, substantially as described and for the purpose set forth.

In testimony whereof I have signed my name to this specification in the presence of two subscribing witnesses.

SYDNEY EVERSHED.

Witnesses:
REGINALD W. JAMES,
RICHARD A. HOFFMANN.